March 28, 1961  L. D. THOSTENSON ET AL  2,976,975
CLUTCH
Filed July 5, 1957
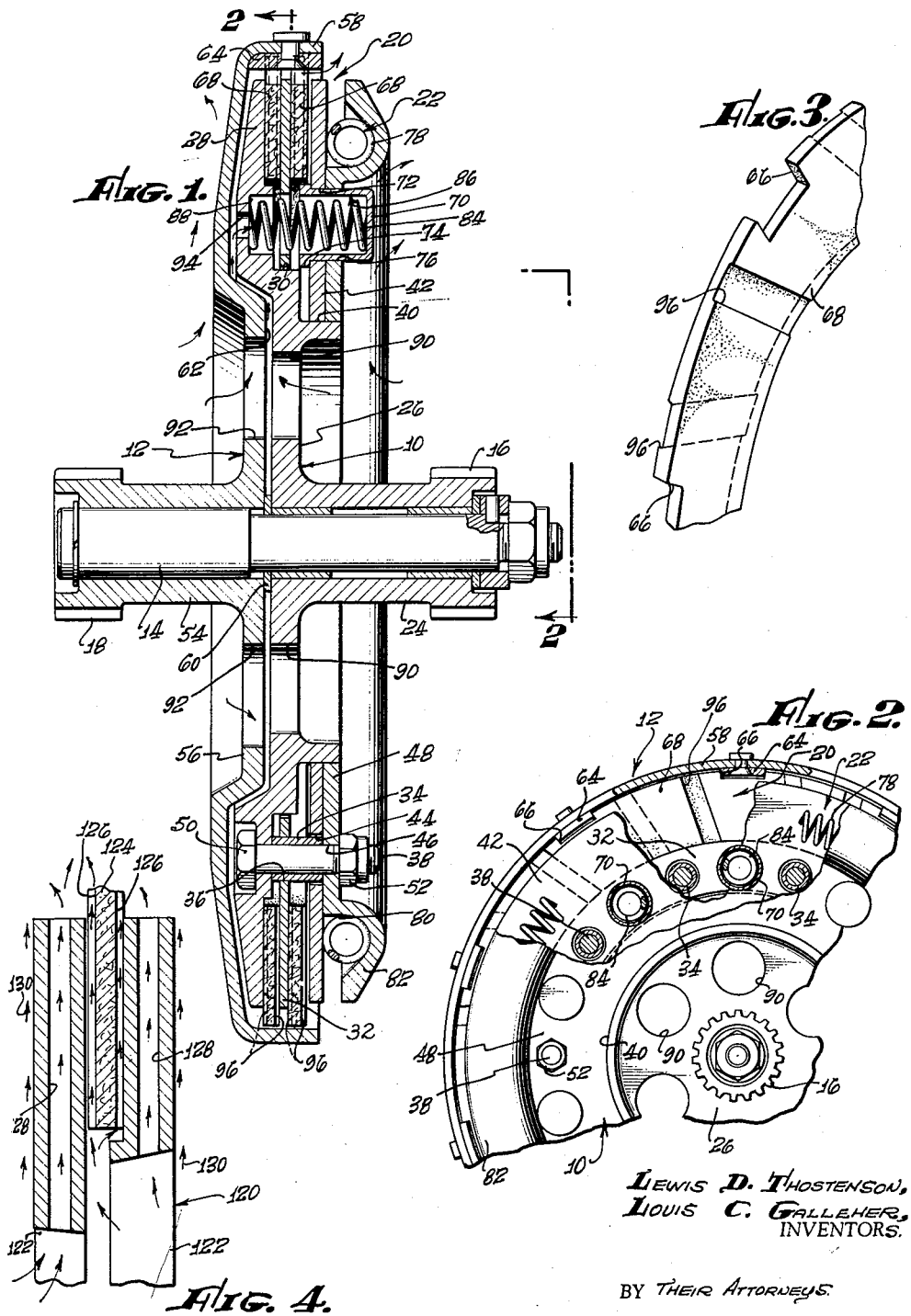
Lewis D. Thostenson,
Louis C. Galleher,
INVENTORS.
BY THEIR ATTORNEYS.
Harris, Kiech, Foster & Harris.

United States Patent Office 2,976,975
Patented Mar. 28, 1961

2,976,975
CLUTCH

Lewis D. Thostenson, Inglewood, and Louis C. Galleher, Alhambra, Calif., assignors to Salsbury Corporation, Los Angeles, Calif., a corporation of California Filed July 5, 1957, Ser. No. 670,114
2 Claims. (Cl. 192—69)

The present invention relates in general to clutches and, more particularly to a centrifugal clutch of the type disclosed in Patent No. 2,260,796 to Bruce Burns, a primary object of the invention being to provide an improved clutch of this character.

Generally speaking, the present invention contemplates a clutch which includes: coaxial driving and driven rotary members; means, including an axially extending series or stack of frictionally interengageable annular clutch elements which are relatively movable in the axial direction, for coupling the rotary members together, alternate clutch elements being carried by and being rotatable with the driving member and the intervening clutch elements being carried by and being rotatable with the driven member; and centrifugal actuating means responsive to rotation of the driving member for relatively axially moving the elements to produce frictional interengagement thereof so as to couple the driven member to the driving member. The centrifugal actuating means may include an annular coil spring which acts on one end of the series of frictionally interengageable clutch elements and engages a frusto-conical annular ramp on the driving member, whereby the spring produces frictional interengagement of the clutch elements at a predetermined rotational speed of the driving member. In the embodiment considered herein, the clutch elements are frictionally interengaged above a predetermined minimum rotational speed of the driving member.

A primary object of the invention is to provide a clutch of the foregoing nature having improved means for dissipating frictionally-generated heat from the clutch elements.

More particularly, an important object of the invention is to provide a series of frictionally interengageable clutch elements wherein alternate annular clutch elements are of friction material and are provided on opposite sides thereof with radial grooves extending from the inner peripheries of these clutch elements to the outer peripheries thereof, the clutch including means providing an air inlet extending from the atmosphere to the inner ends of the grooves to provide for free flow of cooling air from the atmosphere into the inner ends thereof, and including means providing an air outlet extending from the outer ends of these grooves to the atmosphere to provide for free flow of cooling air from the outer ends thereof to the atmosphere. With this construction, the action of centrifugal force resulting from rotation of various parts of the clutch pumps cooling air from the inlet through the grooves in the grooved annular clutch elements to the outlet as the driving and driven members rotate, thereby dissipating frictionally generated heat from all of the clutch elements, which is an important feature.

Another object is to provide a clutch wherein the driving and driven members are axially separated to provide an annular clearance therebetween which communicates with the atmosphere adjacent its inner and outer peripheries so that centrifugal force pumps cooling air through this annular clearance as the driving member rotates to assist in dissipating frictionally generated heat from the clutch. Another object in this connection is to provide a clutch wherein the inner ends of the grooves in the grooved annular clutch elements communicate with the annular clearance mentioned so that the air inlet for these grooves includes a portion of said annular clearance.

A further object of the invention is to provide elongated spring cavities in the driving member which are spaced apart circumferentially and which are oriented with their axes parallel to the axis of rotation of the rotary members and to provide in each spring cavity a coil spring acting in compression to bias the frictionally interengageable clutch elements apart, the lengths of the spring cavities and the spring means therein being substantially greater than the axial length of the series of clutch elements. With this construction, spring means of satisfactory length may be provided within a space of limited axial length, which is an important feature. Also, the spring cavities serve to prevent the springs from being distorted due to the action of centrifugal force thereon.

Another object is to provide a clutch wherein the inner ends of the grooves in the grooved annular clutch elements communicate with the spring cavities and the latter communicate with the annular clearance between the driving and driven members so that the spring cavities form parts of the air inlet for the inner ends of these grooves. This construction further assists in maintaining the entire clutch at a desirably low operating temperature by dissipating frictionally generated heat from various portions of the clutch.

Another object is to provide a clutch wherein the annular clutch elements carried by the driving member are provided with generally radial cooling passages through which air is pumped by centrifugal force.

The foregoing objects, advantages, features and results of the present invention, together with various other objects, advantages, features and results thereof which will be evident to those skilled in the clutch art in the light of this disclosure, may be attained with the exemplary embodiment of the invention described in detail hereinafter and illustrated in the accompanying drawing, in which:

Fig. 1 is a longitudinal section view of a centrifugal clutch which embodies the invention;

Fig. 2 is a fragmentary transverse sectional view on a reduced scale taken as indicated by the irregular arrowed line 2—2 of Fig. 1;

Fig. 3 is a fragmentary perspective view of a grooved annular clutch element of the invention; and Fig. 4 is a fragmentary sectional view illustrating another embodiment of the invention.

In Figs. 1 to 3 of the drawing, the numerals 10 and 12 respectively designate coaxial driving and driven rotary members mounted on a shaft 14 for relative rotation and respectively connectible to any desired driving and driven devices, not shown, as by means of gears 16 and 18 on the driving and driven members, respectively. The clutch of the invention also includes frictional coupling means, designated generally by the numeral 20, for coupling the driven member 12 to the driving member 10, and includes centrifugal actuating means 22 responsive to a predetermined speed of rotation of the driving member for energizing the coupling means.

The driving member 10 includes a hub 24 carrying an annular web 26 having thereon an annular metallic clutch element 28 which forms the outer periphery of the driving member and which forms part of the coupling means 20. The driving member 10 is provided, radially inwardly of the annular clutch element 28, with a radially-outwardly-facing annular shoulder 30 over which a metallic annular clutch element 32 is telescoped. The annular clutch element 32 also forms part of the coupling means 20 and is axially movable relative to the driving member 10 on circumferentially spaced bushings 34 which extend through holes 36 in the driving member and which are telescoped over bolts 38 carried by the driving member. The latter member is further provided with a radially-outwardly-facing annular shoulder 40, located radially inwardly from the annular shoulder 30, on which an annular, metallic clutch element 42 forming part of the coupling means 20 is axially slidable. The bushings 34 project through enlarged holes 44 in the clutch element 42 and the bolts 38 extend through holes 46 in a cover 48 carried by the driving member 10 and enclosing the coupling means 20 and the centrifugal actuating means 22. The cover 48 is also telescoped over the annular shoulder 40, but is prevented from moving axially by the bolts 38 and the bushings 34. More specifically, the bolts 38 are provided with heads 50 which seat against the driving member 10 and have threaded thereon nuts 52 which are seated against the cover 48 so that the heads 50 and the nuts 52 prevent axial separation of the driving member and the cover, the bushings 34 serving as spacers to prevent axial movement of the driving member and the cover toward each other.

The driven member 12 includes a hub 54 carrying an annular web 56 which terminates in an axially oriented, peripheral flange 58, the driving and driven members being axially separated by a thrust washer 60 on the shaft 14 to provide an annular clearance 62 therebetween for a purpose to be described. Disposed radially inwardly of and riveted, or otherwise secured, to the flange 58 of the driven member 12 are keys 64 disposed in notches 66 in the outer peripheries of annular clutch elements 68 of friction material, these clutch elements also forming parts of the coupling means 20. One of the clutch elements 68 is disposed between the clutch elements 28 and 32 while the other is disposed between the clutch elements 32 and 42.

With the foregoing construction, the keys 64 cause the driven member 12 to rotate with the clutch elements 68 to transmit rotation from these clutch elements to the driven member. The clutch elements 28, 32 and 42 are frictionally engageable with the clutch elements 68 to transmit rotation from the former clutch elements to the latter, the clutch elements 28, 32 and 42 being rotatable with the driving member 10. Rotation of the clutch element 28 with the driving member 10 results from the fact that this clutch element is integral with the driving member, while rotation of the clutch elements 32 and 42 with the driving member is produced by engagement of the bushings 34 with the peripheries of the holes 36 and 44 in this clutch element. Rotation of the driving member 10 is transmitted to the cover 48 by the bolts 38.

As will be apparent, when the driving member 10 is rotating with the clutch elements 28, 32 and 42 out of engagement with the clutch elements 68, the coupling means 20 is incapable of transmitting rotation to the driven member 12. However, by moving the clutch element 42 axially toward the clutch element 28 to cause one of the clutch elements 68 to frictionally engage the clutch elements 28 and 32 and to cause the other clutch element 68 to frictionally engage the clutch elements 32 and 42, the coupling means 20 is energized to transmit rotation to the driven member 12, it being understood that the keys 64 in the notches 66 in the clutch elements 68 permit axial movement of the latter clutch elements to produce the frictional interengagement outlined.

Considering the manner in which the coupling means 20 is energized by the centrifugal actuating means 22 to frictionally interengage the clutch elements 28, 32, 42 and 68, the centrifugal actuating means is shown as comprising a single annular coil spring 78 in tension, although it may comprise the coil spring 78 with weights therein, or weights may be substituted therefor. The coil spring 78 is normally seated on a radially-outwardly-facing shoulder 80 on the cover and between a frusto-conical annular flange 82 on the cover and the clutch element 42, as shown in Fig. 1 of the drawing. The annular flange 82 constitutes an annular ramp for the spring 78 and converges radially outwardly toward the clutch element 42 so that, when the driving member 10 is rotated at a speed in excess of a predetermined minimum, the action of centrifugal force causes the spring 78 to expand radially and tend to wedge between the clutch element 42 and the ramp 82. Such expansion and consequent wedging of the spring 78 result in axial movement of the clutch element 42 with eventual frictional interengagement of all of the clutch elements 28, 32, 42 and 68 to couple the driven member 12 to the driving member 10. When the speed of the driving member 10 is reduced below the predetermined minimum at which the spring 78 is effective to energize the coupling means 20, the frictional interengagement between the various clutch elements 28, 32, 42 and 68 is insufficient to transmit rotation to the driven member 12.

It will be understood that, if desired, another ramp, not shown, similar to and facing in the opposite direction from the ramp 82, may be inserted between the spring 78 and the clutch element 42 to move axially with this clutch element, thereby providing a double ramp construction.

To insure disengagement of the clutch elements forming the coupling means 20 when the driving member 10 is rotating at a speed less than the critical one, springs 84 acting in the axial direction and biasing the clutch elements 28 and 42 apart are provided. The clutch includes circumferentially spaced, axially oriented spring cups 70 with the respective peripheries of holes 72 in the clutch element 42, these spring cups being provided at their inner ends with annular flanges 74 seated against the inner side of the clutch element 42 and be slidable in holes 76 in the cover 48. The springs 84 are disposed in spring cavities 86 each of which is formed in part by one of the spring cups 70 and in part by a recess 88 in the driving member which is aligned with and spaced axially from the corresponding spring cup. One end of each spring 84 is seated against the bottom of the corresponding recess 88 and the other end thereof is seated against the bottom of the corresponding spring cup 70. Consequently, the springs 84 act to bias the clutch element 42 axially away from the clutch element 28 to deenergize the coupling means 20.

An important feature is that the use of the spring cups 70 permits the employment of springs 84 having lengths considerably greater than the axial length of the coupling means 20, i.e., than the axial length of the series of clutch elements forming the coupling means. Consequently, this structure provides spring lengths adequate to obtain the desired spring rates without increasing the over-all length of the clutch. Also, confining the springs 84 in the spring cavities 86 prevents distortion thereof under the influence of centrifugal force.

Considering the manner in which the clutch hereinbefore described is cooled in accordance with the invention so as to dissipate frictionally generated heat resulting from slippage of the various clutch elements forming the coupling means 20, rotation of the driving and driven members 10 and 12, and particularly rotation of the former, produces outward air flow under the action of centrifugal force and this air flow is conducted through the clutch to produce cooling. More particularly, the webs 26 and 56 of the driving and driven members 10 and 12 are provided with openings 90 and 92 through which atmospheric air may flow into the annular clearance 62 between the driving and driven members. The action of centrifugal force causes the air entering the annular clearance 62 in this fashion to flow radially outwardly between the driving and driven members 10 and 12, such air withdrawing heat from the driving and driven members and eventually escaping into the atmosphere at the periphery of the clutch through clearances between the peripheries of the clutch elements 68 and the flange 58 and through clearances between the keys 64 and the walls of the notches 66 in the clutch elements 68. The air flowing through the annular clearance 62 in this fashion flows over large areas of the driving and driven members 10 and 12 to carry away considerable quantities of heat therefrom.

The recesses 88 forming parts of the spring cavities 86 also communicate with the annular clearance 62 through holes 94 through which air may flow into the spring cavities. From the spring cavities 86, the air flows radially outwardly under the influence of centrifugal force through the axial spaces between the open ends of the recesses 88 and the open ends of the spring cups 70. From these axial spaces, the air flows radially outwardly into the inner ends of generally radial grooves 96 in the axially-facing annular surfaces of the clutch elements 68. The air continues to flow outwardly through the grooves 96 and ultimately escapes from the clutch through the clearances between the outer peripheries of the clutch elements 68 and the flange 58 and through the clearances between the keys 64 and the walls of the notches 66. The air flowing through the grooves 96 and the clutch elements 68 in this fashion, which flow occurs as long as the driving member 10 is rotating, traverses large areas of the various clutch elements of the coupling means 20 and thus dissipates considerable heat from the clutch. Further heat dissipation results from the fact that the air first flows through the spring cavities 86, which have relatively large surface areas to permit substantial heat dissipation into the radially-outwardly flowing air. Additional cooling is achieved through the action of centrifugal force in propelling air radially outwardly over the external surfaces of the driven member 12 and the cover 46.

Referring to Fig. 4 of the drawing, illustrated therein is a clutch coupling means 120 which includes driving annular clutch elements 122 and an intermediate, driven annular clutch element 124 of friction material. The latter is provided with generally radial cooling grooves 126 on both sides thereof in the same manner as the clutch elements 68 of the clutch coupling means 20. The clutch elements 122 are provided with generally radial, internal cooling passages 128. In response to rotation of the driving clutch elements 122, the action of centrifugal force pumps cooling air radially outwardly through the grooves 126 and the passages 128 to maintain the clutch elements 122 and 124 at satisfactory operating temperatures, cooling air flow through the grooves 126 being enhanced by rotation of the clutch element 124. Also, the clutch elements 122 in this embodiment are spaced axially from any surrounding structure so that cooling air flow may take place thereover axially externally of the coupling means 120, as indicated by the arrows 130, such surrounding structure being provided with peripheral air-escape openings, not shown.

Thus, the net result of the foregoing cooling actions is to cause the clutch of the invention to operate at satisfactorily low temperatures even under conditions of frequent and/or prolonged slippage of the clutch elements making up the coupling means, which is an important feature.

Although an exemplary embodiment of the invention has been disclosed herein for purposes of illustration, it will be understood that various changes, modifications and substitutions may be incorporated in such embodiment without departing from the spirit of the invention as defined by the following claims.

We claim:

1. In a clutch, the combination of: coaxial driving and driven rotary members; means for coupling said rotary members together so as to transmit rotation of said driving member to said driven member, including two driving clutch elements and a driven clutch element arranged in alternating relation in the direction of the axis of rotation of said rotary members and relatively movable in the axial direction, said driving clutch elements being carried by and being rotatable with said driving member, and said driven clutch element being carried by and being rotatable with said driven member, at least one of said clutch elements having radial passages therethrough which have inner and outer ends and which communicate with the atmosphere at their outer ends; means providing elongated spring cavities in said driving member which communicate with the inner ends of said radial passages, said spring cavities being spaced apart circumferentially and the axes thereof being parallel to the axis of rotation of said rotary members, each of said spring cavities having end walls respectively connected to said driving clutch elements; compression coil springs respectively disposed in said spring cavities and engaging said end walls thereof to bias said driving clutch elements apart; and means spacing said rotary members apart axially and providing therebetween an annular air inlet which communicates with said spring cavities through apertures in said driving rotary member and which extends radially inwardly from said apertures toward the axis of rotation of said rotary members and which communicates radially inwardly of said apertures with the atmosphere through openings in at least one of said rotary members, whereby cooling air may flow radially outwardly through said openings, said air inlet, said apertures, said spring cavities and said radial passages.

2. In a clutch, the combination of: coaxial driving and driven rotary members; two driving clutch elements and a driven clutch element arranged in alternating relation in the direction of the axis of rotation of said rotary members, one of said driving clutch elements being movable in the axial direction relative to said driven clutch element and said driven clutch element being movable in the axial direction relative to the other of said driving clutch elements, said driving clutch elements being carried by said driving member and said driven clutch element being carried by said driven member; a ramp member coaxial with said driving and driven members and rigidly connected to said driving member, said ramp member having an annular ramp thereon adjacent said one driving clutch element and converging radially outwardly theretoward; an annular coil spring carried by said ramp member between said ramp and said one driving clutch element, whereby radial expansion of said spring under the influence of centrifugal force upon rotation of said driving member causes said spring to move radially outwardly over said ramp and said one driving clutch element to bias said one driving clutch element into engagement with said driven clutch element and said driven clutch element into engagement with said other driving clutch element; circumferentially spaced cups connected to said one driving clutch element and projecting axially through said ramp member, said driving member having recesses therein aligned with and facing said cups, said cups and said recesses cooperating to provide spring cavities; and compression coil springs respectively disposed in said spring cavities and each seated at one end against said driving member and at its other end against the corresponding one of said cups.

References Cited in the file of this patent

UNITED STATES PATENTS

| | | |
|---|---|---|
| 1,635,353 | Alley | July 12, 1927 |
| 1,682,493 | Ehrenfeld | Aug. 28, 1928 |
| 1,731,416 | Gurney | Oct. 15, 1929 |
| 2,057,876 | Berry | Oct. 20, 1936 |
| 2,095,094 | Glasner | Oct. 5, 1937 |
| 2,107,954 | Morton et al. | Feb. 8, 1938 |
| 2,180,086 | Kraft | Nov. 14, 1939 |
| 2,201,567 | Walters | May 21, 1940 |
| 2,241,242 | Friedman | May 6, 1941 |
| 2,260,796 | Burns | Oct. 28, 1941 |
| 2,348,025 | Peets et al. | May 2, 1944 |
| 2,368,299 | Hayter | Jan. 30, 1945 |
| 2,675,106 | Foster | Apr. 13, 1954 |
| 2,684,743 | Trofimov | July 27, 1954 |
| 2,729,320 | Hendrickson | June 3, 1956 |
| 2,827,142 | Aschauer | Mar. 18, 1958 |

FOREIGN PATENTS

| | | |
|---|---|---|
| 483,102 | Great Britain | Apr. 12, 1938 |